J. Gracie,
Oil Still.

No. 99,081.   Patented Jan. 25, 1870.

Witnesses:
R. C. Loveshall
E. C. Fisler

Inventor:
John Gracie,
by Bakewell & Christy,
his Att'ys.

United States Patent Office.

JOHN GRACIE, OF PITTSBURG, PENNSYLVANIA.

Letters Patent No. 99,081, dated January 25, 1870.

IMPROVEMENT IN STILLS FOR HYDROCARBONS AND OTHER SUBSTANCES.

The Schedule referred to in these Letters Patent and making part of the same.

*To all whom it may concern:*

Be it known that I, JOHN GRACIE, of the city of Pittsburg, in the county of Allegheny, and State of Pennsylvania, have invented a new and useful Improvement in the Distillation of Hydrocarbons and other Liquids; and I do hereby declare the following to be a full, clear, and exact description thereof, reference being had to the accompanying drawing, making a part of this specification, in which—

Like letters of reference indicate like parts in each.

Figure 1:
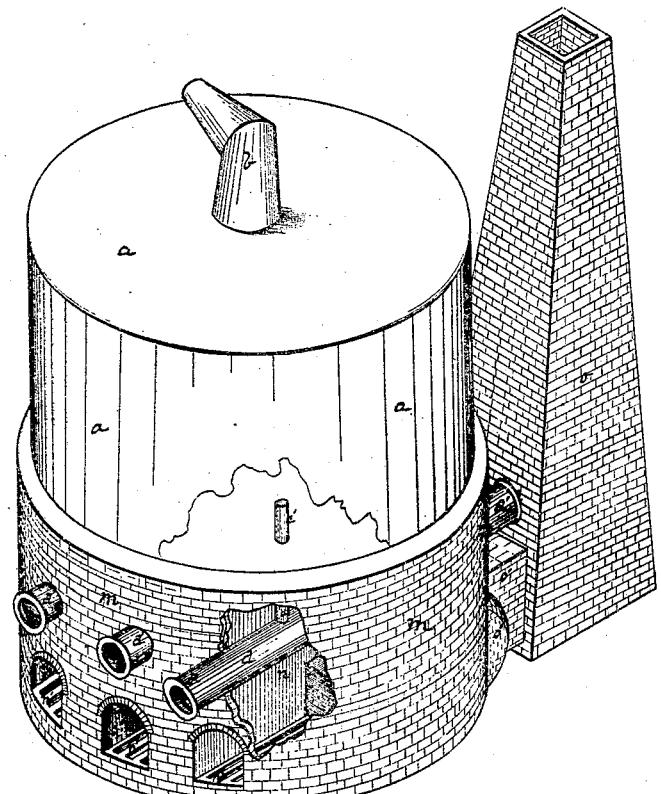
Figure 1 is a perspective view, partly in section, of my improved still.
Figure 2:
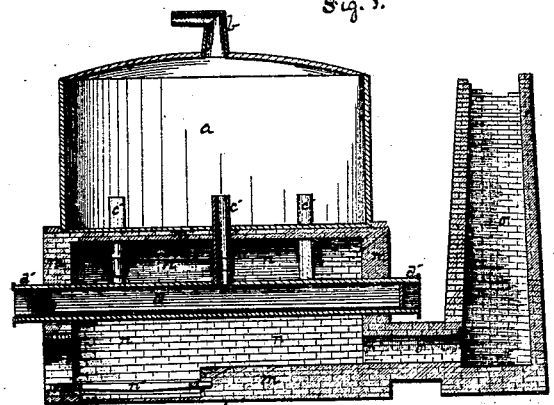
Figure 2 is a vertical section thereof, as formed by a plane extending lengthways of one of the heating-tubes, and through the body of the evaporating-pan.
Figure 3:
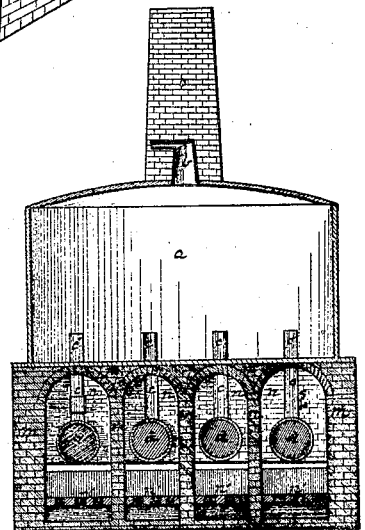
Figure 3 is a vertical section, at right angles to the one shown in fig. 2.

In stills or distilling-pans, as usually constructed, a portion only of the still or pan is exposed to the action of the fire. Another portion is protected from the fire by fire-brick or other non-conducting material, while the top is open to the atmosphere. This is very objectionable in stills or pans for distilling or evaporating liquids of high boiling-points, such as acids, oil, &c.

In the distillation of hydrocarbon, where a high heat is required to distil the heavy oil, the still-bottoms frequently become red hot, while the top and sides of the vessel are comparatively cool. Excessive warping, and frequently the rupturing of the vessel, is the result of this unequal expansion and contraction, rendering the business very expensive and extremely hazardous.

By my invention I propose to render the process of evaporation, concentrating, and distilling of liquids, especially hydrocarbons, less hazardous and less costly, by preventing the overheating and burning, and the unequal expansion and contraction of the still-pan or other evaporating-vessel.

I accomplish this by my improvement on evaporating-vessels of any description, which improvement consists in attaching to the evaporator, by pipes, a heater or heaters, exposed to the action of the fire, so as to heat the fluid contents of the evaporator to the proper temperature, and produce evaporation, and so that the vapors shall so be gathered in the evaporator, and conveyed therefrom by a gooseneck or other known device, the main still being protected at the same time from the injurious action of the fire.

To enable others skilled in the art to make and use my invention, I will proceed to describe its construction and mode of operation.

The evaporator or main body of the still $a$ may be made of any suitable form, closed in on all sides except at the gooseneck $b$ and connecting-pipes $c$, and it may be fitted with gauge-cocks, indicators, man-holes, &c., at pleasure.

It is built on any suitable bed or foundation, $m$, in which foundation are constructed one or more furnaces, with grate-bars $n'$, and fire-spaces or heating-chambers $n$ leading back therefrom, and communicating, by flues $o'$, with a smoke-stack, $o$.

The evaporator $a$ is protected on the side next the fire by a lining, $m'$, of fire-brick or other suitable material, or by being separated therefrom by an intervening space, so that it will not be injuriously acted on by the fire-heat which passes from the grate $n'$ along the heating-chambers or flues $n$.

In each of these chambers $n$, I arrange one or more heaters, $d$, of cylindrical or other convenient shape, in such way that they will be raised to the temperature desired in distilling their contents by the action of the heat thereon, whether such heat be applied directly or through some intervening medium.

I prefer to arrange the heaters $d$ in the chambers or flues $n$, so that they shall be subject to the action of the heat on all sides, but do not desire to limit myself in that respect, since they may be so arranged that they will be heated only over a part of their surface.

The heaters $d$ and the evaporators $a$ are connected with each other by communicating-pipes $c$, one or more to each heater $d$, but preferably two or more, through which the oil or other fluid will flow from the evaporator $a$ into each heater $d$, and, on being heated, will flow up again to give off its vapors by evaporation.

The ends of the heaters $d$ may project through the walls of the foundation $m$, as at $d'$, with a man-hole in either or both ends, closed by a screw-plug, $i$, or other equivalent device. This is for the purpose of convenience in cleaning or drawing off the residuum, if the latter should be deposited therein, or a separate pipe may be attached to each heater for that purpose. I prefer, however, to extend the pipes $c$ up, as at $c'$, above the bottom of the evaporator to a distance about equal to the thickness of the deposit of residuum which an amount of oil equal to the capacity of the evaporator will give.

A continuous flow of oil will thus be kept up through the heaters $d$, but the residuum, if any, will be deposited in the bottom of the evaporator $a$, whence it may be drawn off or removed in the usual way.

With the construction described, the still or evaporator $a$, which is the costly part, is protected against injury from being unduly heated in one part, and its durability greatly increased.

The heaters $d$, being exposed to the action of the fire on all sides, will expand and contract equally, and consequently will wear better; but when one is burned out or otherwise injured, its connection with the evaporator $a$ may be cut off by a stop-cock, $s$, of any known construction, arranged in each of the pipes $c$, and being unjointed, and its contents drawn off through the man-hole $e$, it can be taken out without tearing down the walls $m$, without unseating the still $a$, and without interfering with the work of distillation, which may still go on in the other heaters $d$, which remain uninjured.

The injured heater may then be repaired or reinstated, or a new one put in its place, and being jointed to the pipe $c$, and the cocks $s$ turned, the process of distillation may go on uninterruptedly till the charge is run off; or such repairs or changes may be made between charges, while the residuum of one charge is being removed from the still $a$ and another charge is being filled in.

For the purpose described, a sleeve, $i'$, or other suitable joint, closed with luting or other known packing, may be employed with each pipe $c$.

The mode of distillation and apparatus described, I claim in their application to distillable liquids generally.

It will be observed that the evaporator $a$ should stand with its bottom on a higher level than that of the heaters $d$, but it may be arranged at a distance from them, and, in fact, in another building, with a fire-wall between them. Then, if one of the heaters $d$ explodes, the cock $s$ can be immediately closed, and no damage result to the still, and no loss of oil, except what may be in the heater at the time of the explosion.

I am aware that stills and evaporating-pans have been constructed with heating-pipes leading down into the furnace below, but I am not aware that in any such, the main still or evaporator has been protected from the injurious action of the fire, either by an interposed lining, of low heat-conducting power, or by being arranged at some little distance from the furnace, or in other equivalent manner.

What I claim as my invention, and desire to secure by Letters Patent, is—

1. A main still or evaporator, $a$, in combination with one or more separate communicating-heaters, $d$, the latter being arranged so as to be acted on externally by the heat, and the former being protected therefrom, substantially as hereinbefore set forth.

2. The heaters $d$, one or more in number, each provided with a suitable aperture for drawing off its contents, and so combined with a main still as to be detachable therefrom and removable, substantially as described.

3. A communicating-pipe, $c$, leading from each heater $d$ to the main still $a$, and projecting above the bottom of the main still, substantially as and for the purposes set forth.

In testimony whereof, I, the said JOHN GRACIE, have hereunto set my hand.

JOHN GRACIE.

Witnesses:
   THOS. B. KERR,
   JOHN GLENN.